United States Patent
Aggarwal

(10) Patent No.: US 8,260,774 B1
(45) Date of Patent: Sep. 4, 2012

(54) PERSONALIZATION SEARCH ENGINE

(75) Inventor: Anshu Aggarwal, Edison, NJ (US)

(73) Assignee: Quewey Holding, Inc., Philadelphia, PA (US)

( * ) Notice: Subject to any disclaimer, the term of this patent is extended or adjusted under 35 U.S.C. 154(b) by 338 days.

(21) Appl. No.: 12/622,262

(22) Filed: Nov. 19, 2009

(51) Int. Cl.
G06F 17/30 (2006.01)
G06F 7/00 (2006.01)

(52) U.S. Cl. ............ 707/723; 707/755; 707/758

(58) Field of Classification Search ............ 707/723, 707/755, 758
See application file for complete search history.

(56) References Cited

U.S. PATENT DOCUMENTS 7,827,125 B1 * 11/2010 Rennison ............ 706/14
2010/0070486 A1 * 3/2010 Venkata et al. ............ 707/722

* cited by examiner

Primary Examiner — Kuen Lu
(74) Attorney, Agent, or Firm — Chapin IP Law, LLC

(57) ABSTRACT

Methods and apparatus provide for a personalization search engine that receives a search query from a first user and identifies multiple portions of indexed content—where each respective portion of indexed content has metadata that matches at least one characteristic of the search query. The personalization search engine determines a relevance of each respective portion of indexed content to the first user who provided the search query. It is understood that, in various embodiments, the relevance of a portion of indexed content has to the first user who provided the search query can be based on user feedback associated with an online version of that portion of indexed content. The personalization search engine ranks the multiple portions of indexed content according to their respective relevance to the first user who provided the search query and creates a search result based on ranking the multiple portions of indexed content.

23 Claims, 7 Drawing Sheets

PERSONALIZATION SEARCH ENGINE

BACKGROUND

Conventional computer networking environments support the exchange of information and data between many interconnected computer systems using a variety of mechanisms. In an example computer-networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more server responses back to the client computer systems for receipt by the client software applications. In this manner, client/server software applications can effectively exchange data over a network using agreed-upon data formats.

One example of a conventional information exchange system that operates between computer systems over a computer network such as the Internet is provided by a set of applications and data communications protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML) or the extensible markup language (XML).

The World Wide Web contains billions of static web pages, and it is growing at a very fast speed, with many hundreds or thousands of web pages being created and placed for access on the Internet each day. To be able to efficiently access web pages of interest to people using web browsers, software developers have created web sites that operate as web search engines or portals.

Today's web search engines have their roots in a research field called information retrieval, a computing topic tracing back nearly 50 years. In the mid-1960's the most advanced information technologies of the day could handle only routine or clerical tasks. Starting in the 1990's, web search engines have completely changed how people gather information. No longer must we run to a library to look up something; rather we can pull up relevant documents with just a few clicks on a keyboard by entering a search query into a web search engine. Most web search engines provide an interface to a group of items that enables users to provide a search query and have the Web search engine find information resources related to the words in the search query.

A conventional web search engine includes one or more web crawler processes that are constantly identifying newly discovered web pages. This process is frequently done by following hyperlinks from existing web pages to the newly discovered web pages. Upon discovery of a new web page, the search engine employs an indexer to process and index the content such as the text of this web page within a searchable database by producing an inverted index. Generally, an inverted index is defined as an index into a set of texts of the words in the texts. A searcher then processes user search requests against the inverted index.

When a user operates his or her browser to visit the search engine web site, the search engine web page allows a user to enter one or more textual search keywords that represent content that the user is interested in searching for within the indexed content of web pages within the search engine database. The search engine uses the searcher to match the user supplied keywords to the inverted indexed content of web pages in its database and returns a web page to the user's browser listing the identity (typically a hyperlink to the page) of web pages within the world wide web that contain the user supplied keywords. Popular conventional web search engines in use today include Google, Yahoo!, Lycos, Bing and many others.

BRIEF DESCRIPTION

Conventional web search engines suffer from a variety of deficiencies. In particular, conventional web search engines provide search results that are not personalized to the user who is providing the search query. In other words, if two users enter the same search query, the search result is displayed to both the two user in more or less the same fashion—despite that fact that the two users may have different preferences or be located at a different location. Conventional web search engines also create search results that fail to sort indexed information with respect to (i) the online activities of the user providing the search query or (ii) online content created by other users who have been identified as most likely having similar preferences, tastes, opinions as the user providing the search query. The search query can be any type and/or amount of data—such as keywords about businesses, products, services, places and/or people.

Techniques discussed herein significantly overcome the deficiencies of conventional web search engines such as those discussed above. As will be discussed further, the techniques disclosed herein provide a computer system, computer-implemented method and/or software in the form of a personalization search engine (hereinafter "PSE"). The PSE identifies various portions of indexed content that match a search query. The PSE then analyzes metadata referenced by each matching portion of indexed content in order to determine how relevant each portion of the indexed content is to the source of the search query. The PSE ranks the portions of indexed content according to how relevant each object is to source of the search query. It is understood that the PSE provides a relevant search result even if the source of the search criteria is an anonymous user (i.e. a user that is not registered with or known by the PSE). Therefore, a relevant response will be the same for multiple anonymous users providing the same search criteria. Further, it is understood that a "portion of indexed content" will herein be referred to as an "object." An object can be, for example, used to represent any type of entity—such as a business, product, service, place and/or person(s). An object references metadata—which is (in one embodiment) an aggregation of content about the entity represented by the corresponding object.

In order to determine how relevant an object is to the source of the search query (such as a "first user"), in one embodiment, the PSE considers the online activities of the first user providing the search query. For example, the PSE analyzes feedback (e.g. reviews, ratings, comments, user-created online content) the first user has previously created for various websites and utilizes the feedback in identifying the relevance each object has to the first user.

In addition, the PSE analyzes the feedback provided from a second user (and/or other users) to determine whether the second user has similar tastes, preferences and opinions as the first user who provided the search query. If the PSE determines the second user most likely has similar preferences as the first user, the PSE identifies an object(s) associated with feedback from the second user and determines that object has a relatively high degree of relevance to the first user. Thus, because the PSE has identified the second user as a person whose feedback is most likely indicative of information the first user would consume (or not consume), the PSE ranks an object associated with the second user's feedback in accordance with its relevance to the first user.

Specifically, in various embodiments, a computer implemented system, methods and apparatus described herein provide a PSE that receives a search query from a source—such as, for example, a first user. The PSE identifies multiple objects stored in a data repository—where each respective object matches (or is related to) at least one characteristic of the search query and references metadata.

The PSE determines a relevance of each respective object to the first user who provided the search query. It is understood that, in various embodiments, the relevance of an object has to the first user who provided the search query can be based on user feedback associated with an online version of that object. The PSE ranks the multiple objects according to their respective relevance to the first user who provided the search query and creates a search result based on ranking the multiple objects.

For example, in one embodiment, the PSE has access to a repository of multiple objects (where each object represents indexed content). Each object references metadata further describing, contextualizing and/or identifying the object. When the PSE receives a search query from a first user, the PSE identifies objects that (i) match the search query (including search query stems and synonyms) and (ii) reference metadata that represents online content related to the search query. In various embodiments, the PSE identifies a geographical area associated with the first user and considers only those objects associated with the geographic area—thereby providing a localized search result.

It is understood that each object can reference metadata describes feedback the first user submitted to a website (or any other type of online resource) that is represented by the object. The metadata can also describe feedback from other users. Thus, beyond simply localizing a search result, the PSE can process the feedback to determine if a respective object is relevant to the user—or stated differently—references a uniform resource locator (URL) that provides online information that would most likely be relevant to the first user's needs, tastes, opinions and preferences.

If an object is associated with feedback indicating that other users have generally provided a high rating to the object, then the PSE could consider the high rating as an indication that the object is relevant to the first user. Another approach implemented by the PSE is to review the sentiment of the comments from all the users posting feedback to the online version of the object. Upon performing such sentiment analysis, if the PSE determines the sentiment of the users' feedback is generally positive the PSE considers the corresponding object as relevant to the first user.

Another approach implemented by the PSE attempts to identify a similarity between the first user's feedback and other users' feedback to find relevant objects. If the PSE detects that the first user and a second user have both provided feedback having similar sentiment to an online version of a first object, the PSE identifies a second object with metadata including feedback from the second user. Based on the similarity between the first and second user's feedback, the PSE assumes that the first user most likely has similar preferences and tastes as the second user. Since the second object has metadata indicating positive feedback from the second user, the PSE determines the second object is most likely relevant to the first user's search query.

In addition, it is understood that the metadata is not limited to representing the online activities of users or user-generated online content. The metadata can be representative of any type of digitized content, such as mobile content, keywords related to an object, terms that describe the object, proprietary information about the object, structured corporate data related to the object and/or web page content about the object. and/or any type of data that can be processed by a computing device.

In another embodiment, the PSE receives search criteria from a first source and identifies a indexed keyword(s) that matches at least one term related to the search criteria. The PSE identifies an object(s) assigned to the matching indexed keyword, wherein the object (i) describes an entity and (ii) references aggregated metadata—where the aggregated metadata includes a representation of multiple, disparate instances of online content about the entity. It is understood that the matching, indexed keyword was originally extracted from at least one of the disparate instances of online content now represented in the metadata referenced by the identified object The PSE determines a relevance of the identified object to the first source providing the search criteria, the relevance being indicative of characteristic(s) of the aggregated metadata referenced by the identified object. The PSE creates a search result, wherein the identified object is given a rank position in accordance with the relevance of the identified object. The PSE generates search result content based on at least a portion of the aggregated metadata that is referenced by the identified object and the PSE displays the search result content, within the search result, at the rank position determined according to the identified object's relevance.

It is noted that the PSE can determine the relevance of multiple portions of indexed content in many ways—and is not limited to the examples discussed herein in the "Brief Description" section.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this "Brief Description" section herein does not specify every embodiment and/or incrementally novel aspect of the present disclosure or claimed invention. Instead, this "Brief Description" only provides a preliminary discussion of different embodiments and corresponding points of novelty over conventional techniques. For additional details and/or possible perspectives (permutations) of the invention, the reader is directed to the "Detailed Description" section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a personalization search engine application, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
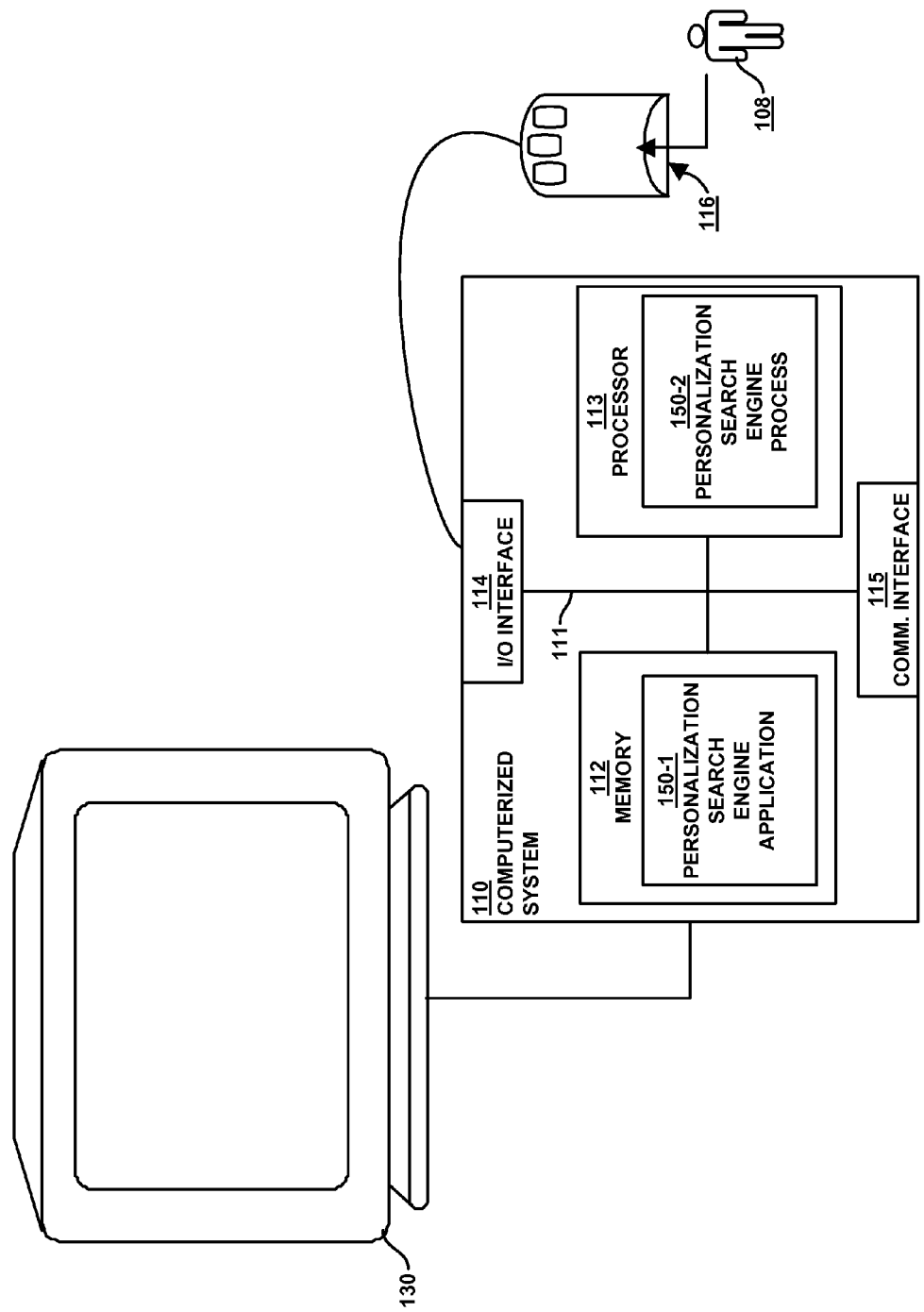
FIG. 1 is an example block diagram illustrating an architecture of a computer system that executes, runs, interprets, operates or otherwise performs a personalization search engine application and/or PSE process according to embodiments herein.

Generally, the techniques disclosed herein provide a computer system, method and/or software in the form of a personalization search engine (hereinafter "PSE"). The PSE matches indexed content to a search query (i.e. a search criteria, an event triggering a search). The PSE then ranks the "matching" indexed content according to how relevant each object is to a source (e.g. a first user) of the search query. It is understood that "a portion of indexed content" will herein be referred to as an "object"—where an object represents a particular entity, such as (for example) a business, a user, a place, a service, a type of service, a product or a type of product.

In order to determine how relevant an object is to the first user providing the search query, the PSE considers the online activities of the first user providing the search query. For example, the PSE analyzes metadata referenced by each object—where the metadata can represent feedback (e.g. reviews, ratings, comments, user-created content) the first user has previously entered into various websites. The PSA analyzes the feedback represented by the metadata to determine the relevance each object has to the first user.

The PSE also analyzes the feedback provided from a second user (or other users) to determine whether the second user and the first user most likely have similar tastes, preferences and opinions. If the PSE determines the second user most likely has similar preferences as the first user, the PSE identifies additional objects referencing metadata representing feedback from the second user and determines those additional objects may have a relatively high degree of relevance to the first user's search query.

Upon determining the relevance of each object, the PSE ranks each object according to their respective relevance to the first user. The PSE thereby provides a personalized search result with regard to the first user whereby the personalized search result considers (i.e. infers) the tastes, opinions and preferences of the first user by analyzing metadata representing the online activities of the first user and other users.

It is understood that the PSE continually builds a data repository against which various search queries can be processed. The data repository contains indexed content (i.e. multiple objects)—which, for example, can be a listing of descriptions and information concerning a multitude of web pages. The PSE also continually builds the indexed content by retrieving new content and indexing it and storing it using the mechanisms already described.

For example, if 'Business A' has a website, the data repository creates an object for 'Business A,' that provides a description of the business, the phone number, contact information, a geographical area associated with the business—as well as other various descriptors pertaining to the types of goods and services of 'Business A.'

In addition, the PSE constantly crawls throughout the Internet and collects and summarizes additional online content—such as user-created online content. For example, if 'User A' posted an online comment on Business A's website, the PSE creates metadata that represents the online comment and creates a reference between the object about 'Business A' and the metadata representing the online comment from 'User A.'

Thus, when the PSE determines the object about 'Business A' matches a characteristic of the search query, the PSE analyzes the referenced metadata to determine how relevant the object about "Business A' is to the first user who provided the search query. Based on the relevance of the object about 'Business A,' the PSE determines a rank position in which to display the object about "Business A' in a search result.

For example, upon receiving a search query (such as search criteria from a user and/or search criteria from any particular type of source), the PSE creates a stem(s) and a synonym(s) based on the search query. The stem(s) and synonym(s) will be processed against the data repository along with any of the keyword(s) present in the search query.

As the PSE processes the search query, the stem(s) and the synonym(s) against the indexed content (i.e. multiple objects) in the data repository, the PSE can add various search constraints. For example, various search constraints can be a geographical area and/or an access control(s). The access control(s) allows the PSE to further filter indexed content matching the search query, the stem(s) and the synonym(s).

The access control(s) indicates various objects that can (or cannot) be included in a search result due to the identity of the source of the search query, the location associated with the source of the search query, and/or an authorization to allow the search query, the stem(s) and the synonym(s) to be processed against a particular object.

While processing the search query, the stem(s) and the synonym(s) (with respect to any search constraints and/or access controls), the PSE provides the advantage of determining how relevant each object in the data repository is to the source of the search query. To determine the respective relevance of each object, the PSE processes the metadata referenced by each object that matches a characteristic of the search query. The PSE thereby utilizes the relevance of each object to create a ranking of the objects for the search result.

With respect to access controls, a portion(s) of metadata can be associated with an access control(s). For example, where a User A has created online content by applying two (or more) ratings (or reviews) to an online location associated with a Business X, one rating is publicly available and the other rating is a private rating viewable only by other privileged users. The publicly available rating may be different than the private rating in terms of content, sentiment, age, amount, detail, etc.

When the PSE receives search criteria about Business X from an anonymous user, the PSE adheres to an access control and uses metadata representing the publicly available ratings in the PSE's ranking calculation for the search result about Business X. However, when a privileged user (such as a user having a social network relationship with User A) provides search criteria about Business X, then both the publicly available rating and the private rating can be used in the PSE's ranking calculation. Thus, in the PSE, since different metadata is associated with differing respective access controls, the relevance rank of an object can be different depending on the anonymity of a user providing the search criteria—or the privilege level of a user providing the search criteria.

There are numerous ways the PSE analyzes metadata to determine the relevance of a corresponding object. In one approach to determine relevance, the PSE detects occurrences of any of the keywords from the search query, the stem(s) and/or the synonym(s). The PSE can take into account how many times each of the keywords are present in the web page(s) represented by the metadata, the pattern of their placement throughout the web page(s) and/or how close (or far apart) they occur to each other.

In another approach to determine relevance of an object, the PSE takes into account the age of the metadata referenced by the object and a rating(s) of the user(s) who created the online content represented by the metadata. For example, a relevance of an object can be influenced by the fact that the metadata represents online content recently created by a highly-rated (i.e. highly-regarded) user. An object can be considered as less relevant if it was created by a low-rated user and/or was not recently created.

Stated differently, in one embodiment, a User A can rate a review written by User B—which is represented by metadata associated with a particular object. User A can rate User B's review as: "good by incorrect (in User A's opinion)," good and correct, or not good. The normalized count of the various ratings applied to User B's review(s) can increase or decrease an overall rating of User B, representing whether User B's review(s) are often seen by other users as good, or incorrect, etc. For example, the normalized count of reviews written by User B deemed as "good" by other users thereby increases User B's rating. As User B's rating increases, then the PSE would weigh metadata representing a review written by User B higher than metadata representing a review written by a user with a lower rating.

In yet another embodiment, the PSE modifies the ratings of a user based on how useful content created by that user is for other users. For example, if metadata represents an answer that User A posted in response to a question originating from user B, and other metadata represents that User B (or any other user) rated User A's response positively (or negatively), then the reaction(s) to User A's response can influence User A's ratings as well.

In another approach to determine relevance of an object, the PSE considers the amount of metadata (e.g. the number of metadata referenced by the object). For example, a object referencing a certain amount of metadata can be considered more (or less) relevant to the source of the search query.

In yet another approach to determine relevance of an object, the PSE considers the web traffic associated with the online content represented by the metadata. For example, the PSE considers how many times other users have "clicked through" the online content represented by the metadata, and/or how many times the online content has been "linked to" by other locations on the Internet, and/or how often a web address associated with the online content has been accessed.

In addition, the PSE can consider whether the online content (represented by the metadata) has been used by a user in a social network environment. For example, the PSE considers how often the online content has been used (or mentioned) in response to a question posted in the social network environment.

In another approach to determine relevance of an object, the PSE analyzes the sentiment of the online content represented by the metadata referenced by the object. The PSE can consider the average sentiment of the online content in determining the relevance, or the PSE can consider the average sentiment of the online content created by a particular user(s). For example, metadata representing user reviews with an overall positive sentiment indicates the corresponding object may be highly relevant to the source of the search query.

In another approach to determine relevance of an object, the PSE analyzes the metadata with respect to a particular user(s). The relevance of the online content represented by the metadata can be influenced by the rating of a particular user who created the online content, the amount of online content created by the particular user (related to that object and/or any other object), the overall sentiment of the particular user's online content, the web traffic (e.g. "click throughs") attributed to the particular user's online content, and/or how the particular user's online content has been utilized in a social networking environment.

In one embodiment, the PSE can determine what type of advertisements to present to a user based on the clicking behavior of the user and a different user. For example, if the PSE presents a first user with a first advertisement and receives a selection of the first advertisement by the first user, the PSE remembers the first user's selection. When the PSE later presents the first advertisement to a second user and the second user also selects the first advertisement, then the PSE infers that the first user and second most likely have some similar tastes, opinions and attitudes. Thus, the PSE will attempt to later present the first user with other advertisements previously selected by the second user, and to later present the second user with other advertisement previously selected by the first user. It is noted that the clicking behavior of any of the users can be represented in the aggregated metadata referenced by any object(s).

It is noted that any kind of user behavior can be considered by the PSE during any of the relevancy approaches discussed herein. For example, the PSE continually updates and utilizes a user profile based on that user's activity with respect to a particular software application(s), computing device(s), and/or consumed content. During any of the relevancy approaches discussed herein, information in a user's profile can be processed with respect to any object and/or any portion of aggregated metadata to influence a relevancy calculation. In addition, information in a user's profile can be processed to determine the kind of content presented to a user (or any other user) in a search result.

In yet another approach to determine relevance of an object, the PSE identifies metadata that represents online content (i.e. "friendly metadata") created by users who have a social network relationship with the source of the search query. The PSE determines the relevance of the object based on the sentiment of the friendly metadata, the ratings of the friendly metadata, the amount of friendly metadata, the amount of responses to the friendly metadata—as well as the overall sentiment of those responses.

In yet another approach to determine relevance of an object, the PSE identifies configurable relationships between objects and/or users as weights used in determining the relevancy of a particular object. For example, a user can select a level of preference with respect to another user(s) and/or an object(s). When the PSE seeks to determine a given object's relevance, the PSE can consider the user's selected preferences as weights that influence the PSE's determination of the given object's relevance and/or the usefulness of another user's ratings, reviews and metadata.

FIG. 1 is an example block diagram illustrating an architecture of a computer system that executes, runs, interprets, operates or otherwise performs a PSE application and/or PSE process according to embodiments herein.

Note that the computer system 110 may be any type of computerized device such as a personal computer, a client computer system, workstation, portable computing device, a mobile device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the PSE 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the PSE application 150-1 and/or the PSE process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the PSE application 150-1. Execution of the PSE application 150-1 in this manner produces the PSE process 150-2. In other words, the PSE process 150-2 represents one or more portions or runtime instances of the PSE application 150-1 (or the entire application 150-1) performing or executing within or upon the processor 113 in the computerized device 110 at runtime.

The PSE application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the PSE application 150-1 can be executed on a remotely accessible computerized device via the communication interface 115.

It is noted that FIGS. 2, 3, 4, 5 and 6 illustrate flowcharts of processing of various embodiments of the PSE 150. The rectangular elements in flowcharts 200, 300, 400, 500 and 600 (in FIGS. 2, 3, 4, 5 and 6—respectively) denote "processing blocks" and represent computer software instructions or groups of instructions upon a computer readable medium. Additionally, the processing blocks represent steps performed by hardware such as a computer, digital signal processor circuit, application specific integrated circuit (ASIC), etc. As the processing in the flowcharts is described, reference will be made various aspect illustrated in FIGS. 1-9, which show examples of this processing.

Flowcharts 200, 300, 400, 500 and 600 do not necessarily depict the syntax of any particular programming language. Rather, flowcharts 200, 300, 400, 500 and 600 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
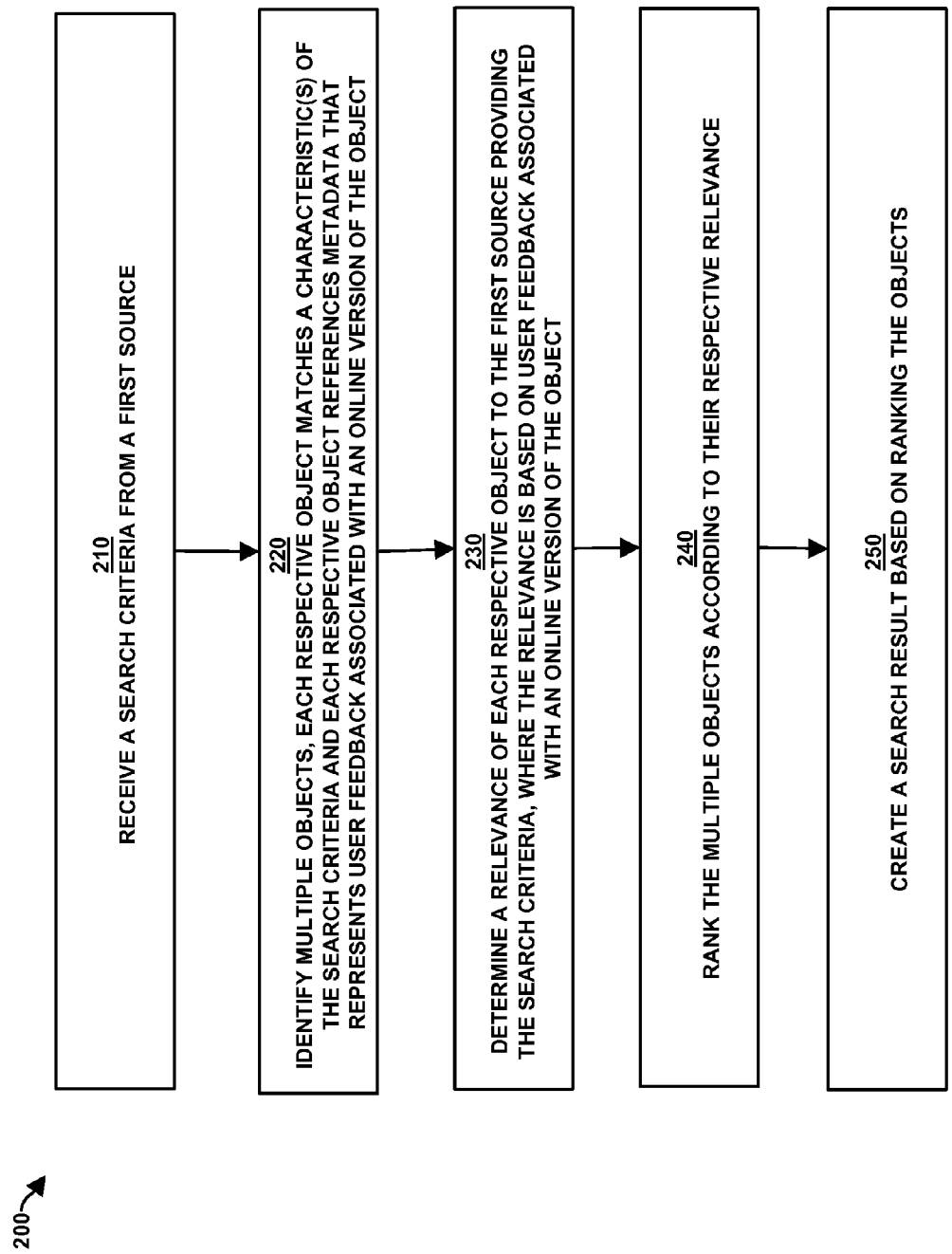
FIG. 2 is a flowchart of an example of processing steps performed by a PSE to rank objects according to their relevance to a source providing a search criteria according to embodiments herein.

FIG. 2 is a flowchart 200 of an example of processing steps performed by a PSE 150 to rank objects according to their relevance to a source providing a search criteria according to embodiments herein.

At step 210, the PSE 150 receives a search criteria from a first source. At step 220, the PSE 150 identifies multiple objects—where each object matches (e.g. is related to) a characteristic(s) of the search criteria. In addition, each respective object references metadata that represents user feedback associated with an online version of the object. The metadata referenced by an object (i.e. a portion of indexed content) can also represent structured content and/or unstructured content in place of (or aggregated with) user feedback—as discussed with regard to FIG. 7.

At step 230, the PSE 150 determines a relevance of each respective object to the first source providing the search criteria, where the relevance is based on user feedback associated with an online version of the object. An online version of the object can be an instance of online content the describes, discusses and/or provides information about the object. At step 240, the PSE 150 ranks the multiple objects according to their respective relevance. At step 250, the PSE 150 creates a search result based on ranking the objects.

Figure 3:
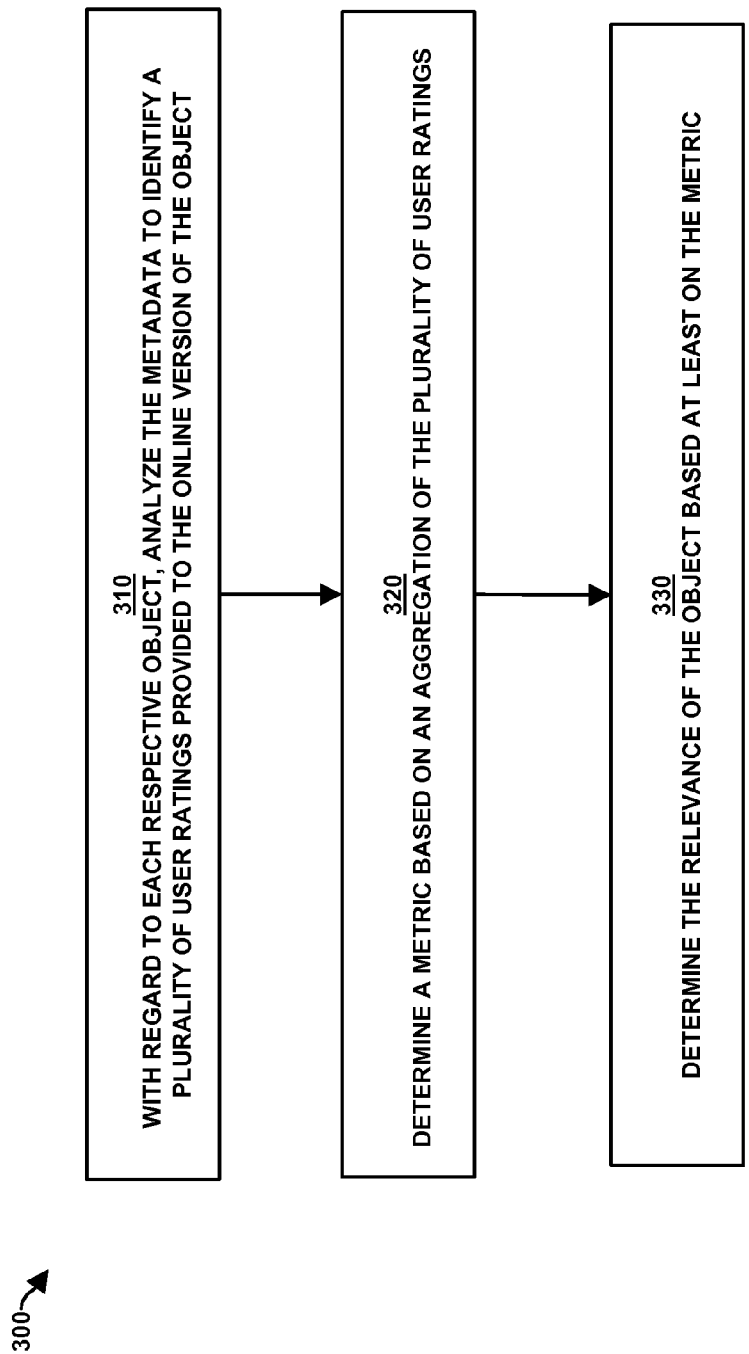
FIG. 3 is a flowchart of an example of processing steps performed by a PSE determine an object's relevance to a source of a search query based on user ratings according to embodiments herein.

FIG. 3 is a flowchart 300 of an example of processing steps performed by a PSE 150 determine an object's relevance to a source of a search query based on user ratings according to embodiments herein.

With regard to each respective object, at step 310, the PSE 150 analyzes the metadata to identify a plurality of user ratings provided to the online version of the object. At step 320, the PSE 150 determines a metric based on an aggregation of the plurality of user ratings and, at step 330, the PSE 150 determines the relevance of the object based at least on the metric.

For example, in another approach to determine relevance of an object, the PSE 150 analyzes metadata referenced by the object to determine the average rating of the online content (represented by the metadata) provided by multiple users, and/or the total number of reviews of the online content.

Figure 4:
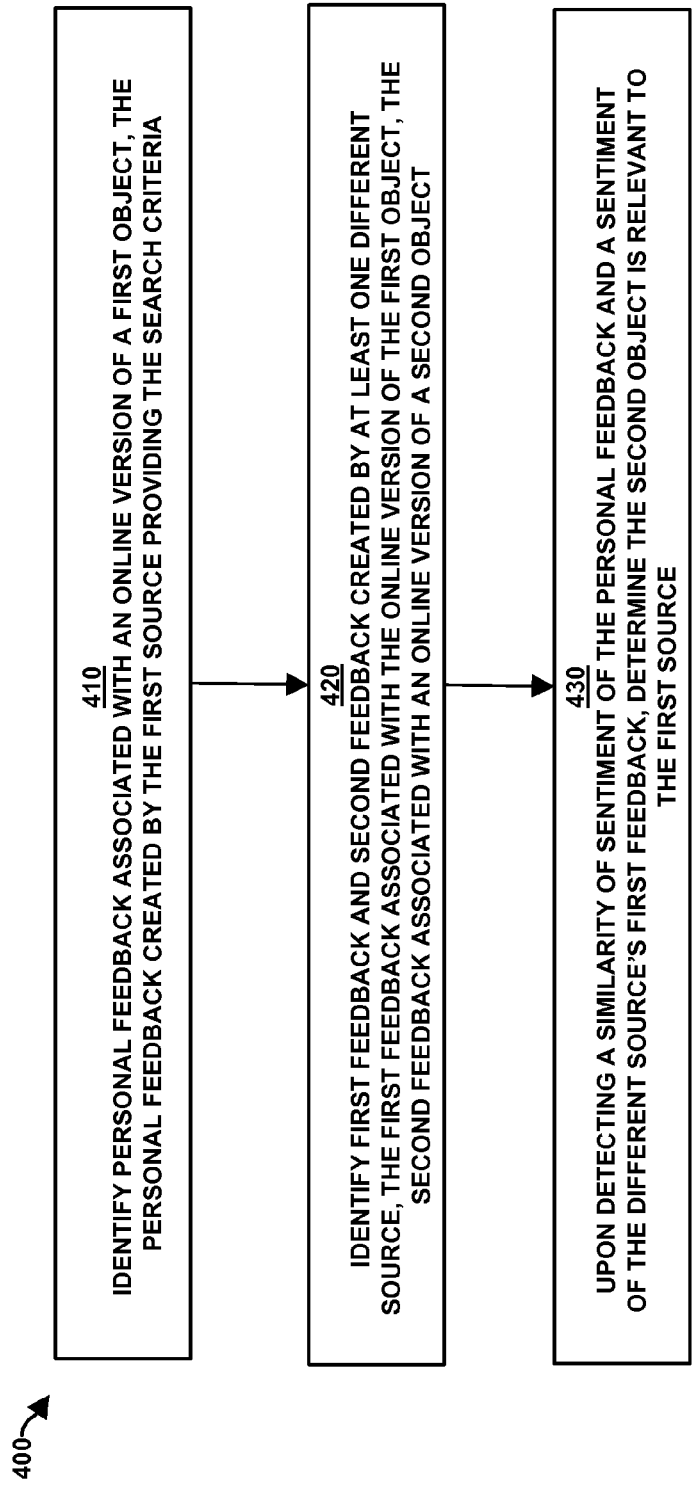
FIG. 4 is a flowchart of an example of processing steps performed by a PSE to determine an object's relevance to a source of a search query based on the sentiment of online content created by one or more users according to embodiments herein.

FIG. 4 is a flowchart 400 of an example of processing steps performed by a PSE 150 to determine an object's relevance to a source of a search query based on the sentiment of online content created by one or more users according to embodiments herein.

At step 410, the PSE 150 identifies personal feedback associated with an online version of a first object, the personal feedback created by the first source providing the search criteria. At step 420, the PSE 150 identifies first feedback and second feedback created by at least one different source, the first feedback associated with the online version of the first object, the second feedback associated with an online version of a second object. At step 430, upon detecting a similarity of sentiment of the personal feedback and a sentiment of the different source's first feedback, the PSE 150 determining the second object is relevant to the first source.

For example, a first object (that matches the search query) references metadata that represents both online content created by the source of the search query, as well as online content created by a different user. Upon detecting a similarity in sentiment between the source's and the different user's online content, the PSE 150 identifies a second object that references metadata representing additional online content also created by the different user.

Since the source of the search query and the different user both similarly reviewed (or rated) the online version of the first object, the PSE 150 identifies the different user as someone with similar tastes, opinions, preferences and interests as the source of the search query. Thus, the PSE 150 deems the additional online content (created by the different user) as similar to online content that the source of the search query would most likely have created with respect to the online version of the second object. Thus, the PSE 150 determines a relevance of the second portion of the indexed content to the source of the search query based on various characteristics of the additional online content created by the different user.

Figure 5:
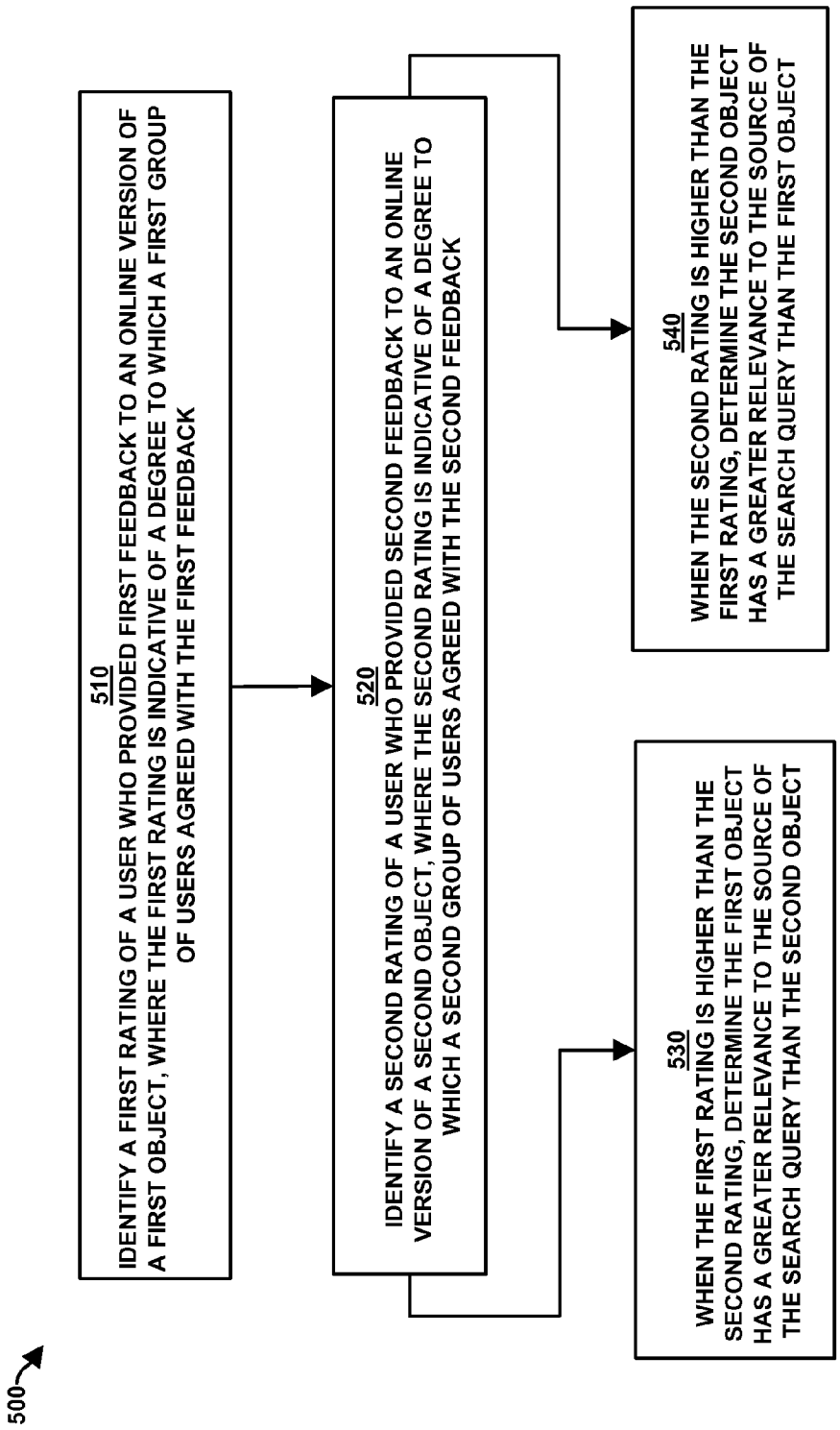
FIG. 5 is a flowchart of an example of processing steps performed by a PSE to determine an object's relevance to a source of a search query based on user rankings according to embodiments herein.

FIG. 5 is a flowchart 500 of an example of processing steps performed by a PSE 150 to determine an object's relevance to a source of a search query based on user rankings according to embodiments herein.

At step 510, the PSE 150 identifies a first rating of a user who provided first feedback to an online version of a first object, where the first rating is indicative of a degree to which a first group of users agreed with the first feedback. At step 520, the PSE 150 identifies a second rating of a user who provided second feedback to an online version of a second object, where the second rating is indicative of a degree to which a second group of users agreed with the second feedback.

When the first rating is higher than the second rating, at step 530, the PSE 150, determines the first object has a greater relevance to the source of the search query than the second object. However, when the second rating is higher than the first rating, at step 540, the PSE 150, determines the second object has a greater relevance to the source of the search query than the first object.

Figure 6:
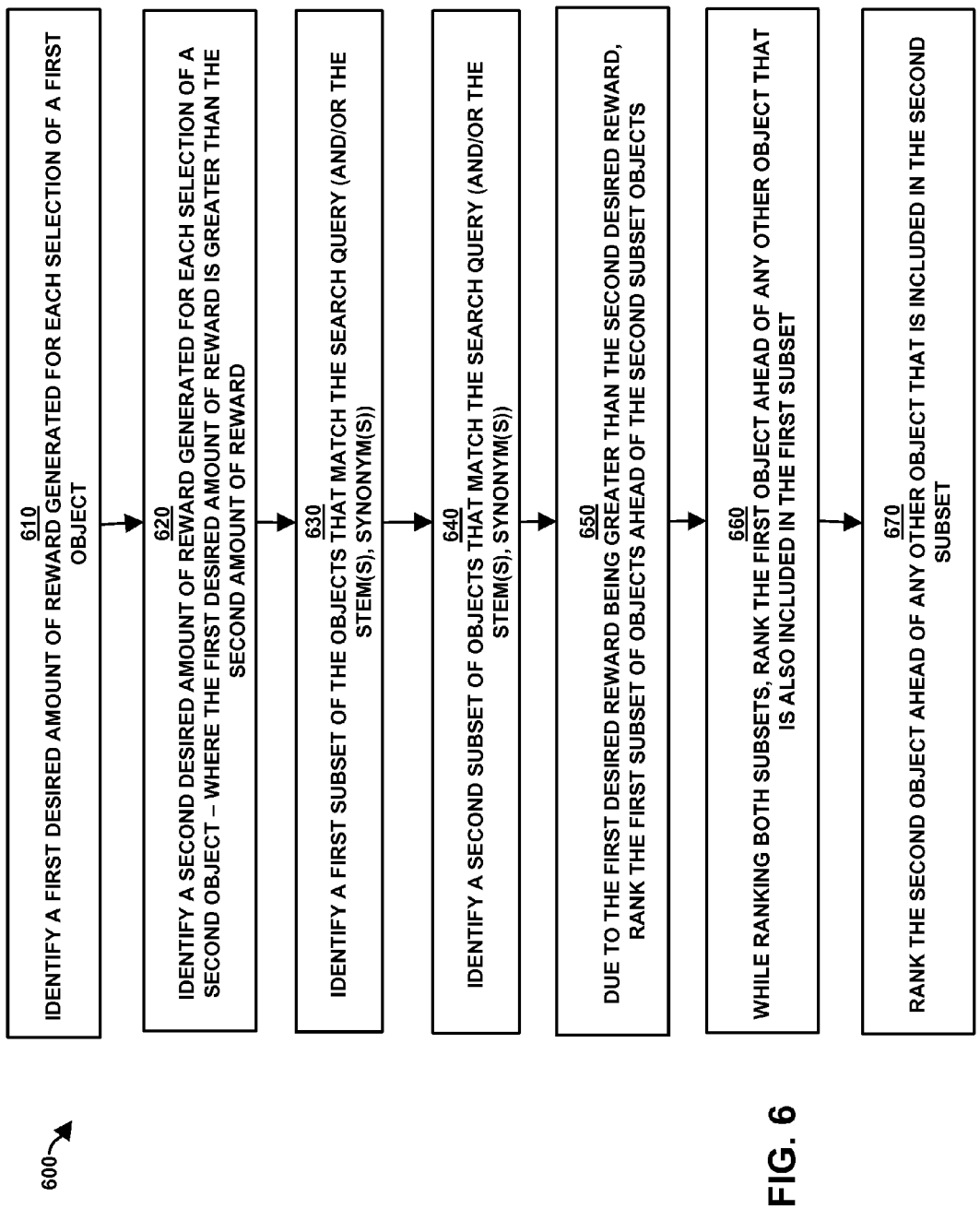
FIG. 6 is a flowchart of an example of processing steps performed by a PSE to modify a rank position of an object based on the revenue created in response to individual selections of the object when the object is presented with a search result according to embodiments herein.

FIG. 6 is a flowchart 600 of an example of processing steps performed by a PSE 150 to modify a rank position of an object based on the revenue created in response to individual selections of the object when the object is presented with a search result according to embodiments herein.

At step 610, the PSE 150 identifies a first desired amount of reward (such as revenue, points, credits) generated for each selection of a first object. At step 620, the PSE 150 identifies a second desired amount of reward generated for each selection of a second object—where the first desired amount of reward greater than the second amount of reward.

At step 630, the PSE 150 identifies a first subset of the objects that match the search query (and/or the stem(s), synonym(s)). At step 640, the PSE 150 identifies a second subset of objects that match the search query (and/or the stem(s), synonym(s)). At step 650, due to the first desired reward being greater than the second desired reward, the PSE 150 rank the first subset of objects ahead of the second subset objects.

While ranking both subsets, at step 660, the PSE 150 ranks the first object ahead of any other object that is also included in the first subset. At step 670, the PSE 150 ranks the second object ahead of any other object that is included in the second subset.

Figure 7:
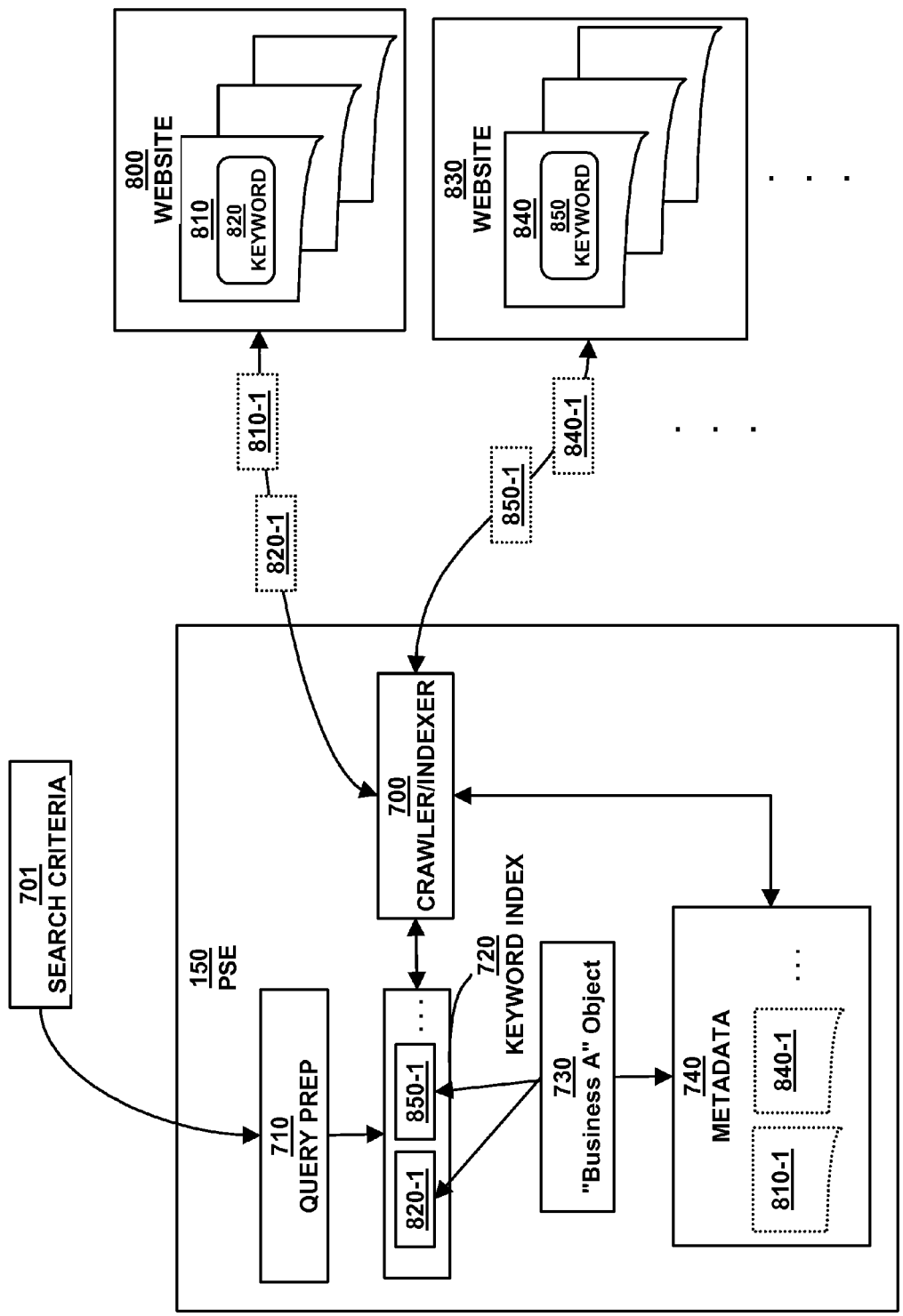
FIG. 7 is a block diagram of a web content being indexed and converted into metadata that is referenced by an object according to embodiments herein.

FIG. 7 is a block diagram of a web content being indexed and converted into metadata that is referenced by an object according to embodiments herein.

The PSE 150 includes a repository containing multiple objects—where an object represents a particular entity, such as (for example) a business, a user, a place, a service, a type of service, a product or a type of product. The PSE 150 also includes a crawler/indexer 700 that crawls through various locations 800, 830 . . . on the Internet (e.g. websites, web pages, social networks, etc.) to identify content 810, 840 about a corresponding object 730. The crawler/indexer 700 obtains the identified content 810-1, 840-1 and aggregates the identified content 810-1, 840-1 to become part of metadata 740 referenced by the object 730. It is understood that the identified content 810-1, 840-1 can be aggregated with other types of content to increase the amount of metadata already referenced by the corresponding object 730. The other types of content that can be aggregated into the metadata can be (for example) various keywords 820, 850 related to the object 730, terms that describe the object 730, proprietary information about the object 730, structured corporate data and/or other web page content about the object 730.

For example, an object 730 representing Business A is created in the repository upon receiving information about Business A. In one embodiment, the information received about Business A can be included in a listing of businesses that provides the names and addresses of each of the businesses. The crawler/indexer 700 crawls throughout multiple locations 800, 830 on the Internet (or any type of network) to identify content 810, 840 about Business A. When the crawler/indexer 700 identifies content 810, 840 about Business A, the crawler/indexer 700 creates metadata 740 representing an aggregation of the identified content 810-1, 840-1 about Business A—and assigns the newly-created metadata 740 to the object 730 representing Business A.

In addition, the crawler/indexer 700 uses the identified content 810, 830 about Business A to build a searchable keyword index 720. The crawler/indexer 700 extracts keywords 820, 850 from the identified content 810, 840 about Business A, assigns the keywords 820-1, 850-1 to the object 730 representing Business A and places the keywords 820-1, 850-1 in the searchable keyword index 720. As the crawler/indexer 700 continues to find additional content about Business A, new metadata representing the additional content is created and aggregated with the metadata 740 already referenced by the object 730 representing Business A. Further, the crawler/indexer 700 can extract additional keywords from the additional content, assign the additional keywords to the object 730 representing Business A and place the additional keywords in the searchable keyword index 720.

It is noted that the index/crawler 700 crawls the Internet to collect structured content about Business A and unstructured content about Business A. An example of structured content can be located on a web site that utilizes a consistent format for the presentation of content. For example, retail websites have a consistent format for presentation of content in that product names are usually displayed to a user in a similar location and manner regardless if the user views web pages about different products on the retail website. An example of unstructured content is content that was created without any predefined format for presentation. Unstructured content has an arbitrary pattern of display (e.g. reviews, ratings, responses, discussions, etc.)—such as respective portions of content created by multiple users.

In another embodiment, structured content can be content the index/crawler 700 encounters without any prior knowledge as to the subject and information embodied in the content. Thus, upon interacting with such structured content, the index/crawler 700 discerns which objects pertain to the various portions of the structured content. Unstructured content can be content that the index/crawler 700 encounters with prior knowledge that the unstructured content provides information about a particular object(s).

Returning to FIG. 7, when the PSE 150 receives a search criteria 701, the PSE 150 creates stems and synonyms based on the search criteria via a query prep module 710. The PSE 150 processes the search criteria, stems and synonyms against the searchable keyword index 720 (e.g. an inverted index) that includes all the keywords 820-1, 850-1 . . . extracted by the crawler/indexer 700.

When a keyword 820-1, 850-1 in the searchable keyword index 720 matches any portion(s) of the search criteria 710 (and its stems and synonyms), the PSE 150 locates an object 730 in the repository that is assigned to any of the matching keywords 820-1, 850-1. The PSE 150 thereby can next move on to determine a relevance (as previously discussed) of the object 730 and rank the object 730 accordingly. The PSE 150 thereby returns a search result based on the ranked object 730, its respective metadata 740 and/or content (such as advertisements) related to metadata 740.

It is understood that the PSE 150 can include multiple objects, each referencing their own metadata and assigned to one or multiple indexed keywords. It is also understood that the indexer/crawler 700 can continually identify, collect and process multiple disparate locations on the Internet (or any content source) that provide information about any entity represented by an object. The crawler/indexer 700 can aggregate publicly available content with private and/or proprietary content.

Further, it is noted that relevancy of any object (that is assigned to any indexed keyword matching a characteristic(s) of a search criteria) can be determined according to any of the approaches to determine object relevancy herein discussed. Such approaches to determine object relevancy can be combined in any manner.

It is also understood that a search criteria need not be interpreted in a traditional sense. Rather, in one embodiment, search criteria can be an event that triggers execution of any of the relevancy approaches discussed herein. For example, detection of any activity or event that alters an object's state, updates metadata, alters a user profile and/or adds data into the PSE (and any of its components and modules) can trigger any of the relevancy approaches discussed herein—even before (or after) a search query is received.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   receiving at least one search criteria from a first source;
   identifying multiple portions of indexed content, each respective portion of indexed content related to at least one characteristic of the search criteria, each respective portion of indexed content referencing metadata;
   determining a relevance of each respective portion of indexed content to the first source who provided the search criteria, the relevance based on user feedback associated with an online version of the portion of indexed content;
   ranking the multiple portions of indexed content according to their respective relevance to the first source who provided the search criteria; and
   creating a search result based on ranking the multiple portions of indexed content.

2. The method as in claim 1, wherein identifying multiple portions of indexed content includes:
   identifying at least one search constraint; and
   identifying at least one portion of indexed local content that satisfies the search constraint.

3. The method as in claim 1, wherein determining the relevance of each respective portion of indexed content to the first source includes:
   for each respective portion of indexed content:
      (i) identifying a plurality of user ratings provided to the online version of the portion of indexed content;
      (ii) determining a metric based on an aggregation of the plurality of user ratings; and
      (iii) determining the relevance of the portion of indexed content based at least on the metric.

4. The method as in claim 3, wherein determining the relevance of the portion of indexed content comprises ranking different types of content including at least one of:
   a business;
   a user;
   a review;
   a service;
   a product;
   a question;
   and an answer.

5. The method as in claim 3, wherein identifying a plurality of user ratings comprises identifying a rating from an anonymous user who is not registered with a personalization search engine (PSE) creating a search result.

6. The method as in claim 1, wherein determining the relevance of each respective portion of indexed content to the first source includes:
   identifying personal feedback associated with an online version of a first
   portion of indexed content, the personal feedback created by the first source providing the search criteria;
   identifying first feedback and second feedback created by at least one different source, the first feedback associated with the online version of the first portion of indexed content, the second feedback associated with an online version of a second portion of indexed content; and
   upon detecting a similarity of sentiment of the personal feedback and a sentiment of the different source's first feedback, determining the second portion of indexed content is relevant to the first source.

7. The method as in claim 1, wherein determining the relevance of each respective portion of indexed content to the source of the search criteria includes:
   identifying a first rating of a user who provided first feedback to an online version of a first portion of indexed content, the first rating indicative of a degree to which a first group of users agreed with the first feedback;
   identifying a second rating of a user who provided second feedback to an online version of a second portion of indexed content, the second rating indicative of a degree to which a second group of users agreed with the second feedback;
   when the first rating is higher than the second rating, determining the first portion of indexed content has a greater relevance to the source of the search criteria than the second portion of indexed content; and
   when the second rating is higher than the first rating, determining the second portion of indexed content has a greater relevance to the source of the search criteria than the first portion of indexed content.

8. The method as in claim 1, wherein ranking the multiple portions of indexed content includes:
   identifying a desired amount of reward generated for selection of at least one particular portion of indexed content; and
   modifying a rank position of the particular portion of indexed content based on the desired amount of reward.

9. The method as in claim 8, wherein identifying the desired amount of reward includes:
   identifying a first desired amount of reward generated for each selection of a first portion of indexed content; and
   identifying a second desired amount of reward generated for each selection of a second portion of indexed content, the first desired amount of reward greater than the second amount of reward.

10. The method as in claim 9, wherein modifying the rank position of the particular portion of indexed content includes:

identifying a first subset within the multiple portions of indexed content,
the first subset including the first portion of indexed content;
identifying a second subset within the multiple portions of indexed content, the second subset including the second portion of indexed content; and
due to the first desired reward being greater than the second desired reward, ranking the first subset ahead of the second subset.

11. The method as in claim 10, comprising:
ranking the first portion of indexed content ahead of any other portion of indexed content included in the first subset; and
ranking the second portion of indexed content ahead of any other portion of indexed content included in the second subset.

12. The method as in claim 1, wherein determining the relevance of each respective portion of indexed content to the first source for each respective portion of indexed content includes:
identifying a first rating of a user providing the user feedback associated with an online version of the portion of indexed content wherein the first rating is indicative of a degree to which a first group of users agreed with the feedback;
identifying a second rating of the user providing a second user feedback associated with an online version of a second portion of indexed content wherein the second rating is indicative of a degree to which a second group of users agreed with the second user feedback;
in response to the first rating being higher than the second rating determine that the portion of indexed content has a greater relevance to the source of the at least one search criteria than the second portion of indexed content; and
in response to the second rating being higher than the first rating determine that the second portion of indexed content has a greater relevance to the source of the at least one search criteria than the first portion of indexed content.

13. The method as in claim 1 further comprising:
receiving at least one second search criteria from a second source;
analyzing feedback provided by the second source;
determining whether the second source has similar preferences as the first source;
in response to determining that the second source has similar preferences as the first source, identifying a second portion of indexed content related to feedback from the second source; and
ranking the second portion of indexed content related to the second source's feedback as relevant to the at least one search criteria.

14. The method as in claim 1 further comprising analyzing metadata of respective portions of indexed content, wherein the metadata represent feedback in the form of at least one of:
reviews;
opinions;
ratings;
rewards;
comments; and
user-created content from the first source previously entered into various websites.

15. The method as in claim 1, wherein the user feedback associated with an online version of the portion of indexed content is provided by a second user different from the first source.

16. A non-transitory computer readable medium comprising executable instructions encoded thereon operable on a computerized device to perform processing comprising:
instructions for receiving at least one search criteria from a first source;
instructions for identifying multiple portions of indexed content, each respective portion of indexed portion matching at least one characteristic of the search criteria, each respective portion of indexed content referencing metadata;
instructions for determining a relevance of each respective portion of indexed content to the first source who provided the search criteria, the relevance based on user feedback associated with an online version of the portion of indexed content;
instructions for ranking the multiple portions of indexed content according to their respective relevance to the first source who provided the search criteria; and
instructions for creating a search result based on ranking the multiple portions of indexed content.

17. The non-transitory computer readable medium as in claim 16, wherein the instructions for identifying multiple portions of indexed content include:
instructions for identifying at least one search constraint; and
instructions for identifying at least one portion of indexed local content that satisfies the search constraint.

18. The non-transitory computer readable medium as in claim 16, wherein the instructions for determining the relevance of each respective portion of indexed content to the first source include:
for each respective portion of indexed content:
(i) instructions for identifying a plurality of user ratings provided to the online version of the portion of indexed content;
(ii) instructions for determining a metric based on an aggregation of the plurality of user ratings; and
(iii) instructions for determining the relevance of the portion of indexed content based at least on the metric.

19. The non-transitory computer readable medium as in claim 16, wherein the instructions for determining the relevance of each respective portion of indexed content to the first source include:
instructions for identifying personal feedback associated with an online version of
a first portion of indexed content, the personal feedback created by the first source providing the search criteria;
instructions for identifying first feedback and second feedback created by at least one different source, the first feedback associated with the online version of the first portion of indexed content, the second feedback associated with an online version of a second portion of indexed content; and
instructions for determining the second portion of indexed content is relevant to the first source upon detecting a similarity of sentiment of the personal feedback and a sentiment of the different source's first feedback.

20. The non-transitory computer readable medium as in claim 16, wherein the instructions for determining the relevance of each respective portion of indexed content to the source of the search criteria include:
instructions for identifying a first rating of a user who provided first feedback to an online version of a first portion of indexed content, the first rating indicative of a degree to which a first group of users agreed with the first feedback;

instructions for identifying a second rating of a user who provided second feedback to an online version of a second portion of indexed content, the second rating indicative of a degree to which a second group of users agreed with the second feedback;

instructions for determining the first portion of indexed content has a greater relevance to the source of the search criteria than the second portion of indexed content when the first rating is higher than the second rating; and instructions for determining the second portion of indexed content has a greater relevance to the source of the search criteria than the first portion of indexed content when the second rating is higher than the first rating.

21. The non-transitory computer readable medium as in claim 16, wherein the instructions for ranking the multiple portions of indexed content include:

instructions for identifying a desired amount of reward generated for selection of at least one particular portion of indexed content; and instructions for modifying a rank position of the particular portion of indexed content based on the desired amount of reward.

22. A computer system comprising:

a processor;

a memory unit that stores instructions associated with an application executed by the processor; and an interconnect coupling the processor and the memory unit, enabling the computer system to execute the application and perform operations of:

receiving at least one search criteria from a first source;

identifying at least one indexed keyword that matches at least one term related to the search criteria;

identifying at least one object assigned to the matching indexed keyword, wherein the object (i) describes an entity and (ii) references aggregated metadata, wherein the aggregated metadata includes a representation of multiple, disparate instances of online content about the entity, the matching indexed keyword originally extracted from at least one of the disparate instances of online content;

determining a relevance of the identified object to the first source providing the search criteria, the relevance indicative of at least one characteristic of the aggregated metadata referenced by the identified object and feedback associated with the aggregated metadata referenced by the identified object provided by a second user different from the first source;

creating a search result, wherein the identified object is given a rank position in accordance with the relevance of the identified object; and generating search result content based on at least a portion of the aggregated metadata; and displaying the search result content, within the search result, at the rank position determined according to the identified object's relevance.

23. A method comprising:

receiving data representative of multiple entities;

instantiating an object to represent each respective entity;

storing each object in a repository;

for each object representing a respective entity:

identifying a plurality of disparate portions of content, wherein each disparate portion of content relates to the entity represented by the object;

extracting at least one keyword from any of the disparate portions of content related to the entity;

inserting the extracted keyword into a searchable keyword index;

assigning the extracted keyword to at least one object representing the entity;

aggregating the plurality of disparate portions of content to create metadata;

creating a reference between the object to the metadata;

upon receiving a search criteria:

identifying at least one keyword in the searchable keyword index related to the search criteria;

identifying a plurality of objects assigned to any identified keyword that relates to the search criteria;

for each object in the identified plurality of objects, determining a relevancy of the object with respect to a source of the search criteria, the relevancy based on at least one characteristic of metadata referenced by at least one object in the repository;

creating a ranking of the identified plurality of objects based on the respective relevancy of each of the identified objects;

creating a search result based on the ranking of the identified plurality of objects and feedback associated with the identified objects provided by a second user.

\* \* \* \* \*